United States Patent [19]

Cruz

[11] 4,346,994

[45] Aug. 31, 1982

[54] SECONDARY ALIGNMENT TARGET FOR AN ELECTRO-OPTICAL ALIGNMENT MEASURING SYSTEM

[75] Inventor: Jose C. Cruz, Columbus, Ind.

[73] Assignee: Cummins Engine Company, Inc., Columbus, Ind.

[21] Appl. No.: 162,937

[22] Filed: Jun. 25, 1980

[51] Int. Cl.³ .............................................. G01B 11/26
[52] U.S. Cl. ..................................... 356/152; 356/400
[58] Field of Search ........................ 356/400, 141, 152

[56] References Cited

U.S. PATENT DOCUMENTS

| | | | |
|---|---|---|---|
| 3,323,408 | 6/1967 | Bishop et al. | |
| 3,341,707 | 9/1967 | Wingfield et al. | 356/152 |
| 3,470,377 | 9/1969 | Le Febre et al. | 356/152 |
| 3,518,005 | 6/1970 | Weber | 356/138 |
| 3,552,859 | 1/1971 | Snyder | 356/152 |
| 3,709,608 | 1/1973 | Degan et al. | 356/152 |
| 3,723,013 | 3/1973 | Stirland et al. | 356/152 |
| 3,762,820 | 10/1973 | Zoot et al. | 356/152 |
| 3,790,276 | 2/1974 | Cook et al. | |
| 3,816,000 | 6/1974 | Fiedler | 356/152 |
| 3,819,272 | 6/1974 | Crozier | 356/152 |
| 3,990,796 | 11/1976 | Foltz, Jr. | 356/152 |
| 4,105,339 | 8/1978 | Wirtanen | 356/152 |

FOREIGN PATENT DOCUMENTS

| | | |
|---|---|---|
| 1036723 | of 0000 | United Kingdom . |
| 1147521 | of 0000 | United Kingdom . |
| 1178007 | of 0000 | United Kingdom . |
| 1235510 | of 0000 | United Kingdom . |
| 1255362 | of 0000 | United Kingdom . |
| 1345381 | of 0000 | United Kingdom . |
| 1496760 | of 0000 | United Kingdom . |
| 1548266 | of 0000 | United Kingdom . |

*Primary Examiner*—S. C. Buczinski
*Attorney, Agent, or Firm*—Sixbey, Friedman & Leedom

[57] ABSTRACT

The secondary optical alignment target (100) of the present invention includes a housing (102) through which an optical beam (122) is directed. A beam splitter (104) mounted in the housing (102) passes one portion (128) of the beam out of the target (100) to maintain the reference line of sight initially established by the axis of the optical beam (122). The other portion (126) of the beam is reflected toward an optical window (110) which further splits the reflected portion (126) into reflected (130) and refracted sub-portions. The refracted sub-portion of the beam furnishes optical information regarding the translational orientation of the target (100), while the reflected sub-portion (130) of the beam is rereflected by beam splitter (104) to furnish a return beam (134) containing optical information regarding the rotational orientation of the target (100). A photodetector (112) mounted in the housing (100) detects the refracted subportion and photodetector (28′) mounted at the optical beam source (2′) detects the return beam (134). A method for using a plurality of targets (100) to simultaneously align a plurality of target stations is described.

21 Claims, 9 Drawing Figures

SECONDARY ALIGNMENT TARGET FOR AN ELECTRO-OPTICAL ALIGNMENT MEASURING SYSTEM

DESCRIPTION

1. Technical Field

This invention relates to an electro-optical measuring apparatus for determining the translational and rotational displacement of a plurality of alignment stations. Specifically, the disclosed apparatus is designed to measure multi-station translational and rotational alignment without the need for re-establishing a reference line-of-sight at each individual station.

2. Background Art

In recent years, highly accurate alignment systems for determining the relative positions of a pair of surfaces have been developed. Such systems utilize laser technology in combination with precision optical elements and photoelectric components to establish reference coordinates and detect deviations therefrom. For example, U.S. Pat. No. 3,522,859, issued to Snyder III on Jan. 5, 1971, discloses an optical instrument sensitive to the parallelism or non-parallelism of two reflecting surfaces wherein a laser beam is separated into two components and simultaneously directed towards two mirrors mounted on separate surfaces. The reflected laser beam components are returned to a beam converger in a manner such that the coincidence or non-coincidence of the two beam components respectively indicate whether or not the two mounting surfaces lie in parallel planes. Another type of optical alignment system is illustrated in U.S. Pat. No. 3,470,377, issued to Le Febre et al on Sept. 30, 1969. Le Febre et al employ an autocollimator including a photosensor array to detect the pitch and yaw of a remote reflected element arranged to form a return beam for projection onto the photosensor array. The Le Febre et al system is also capable of determining the normal translation of the remote reflective element relative to the reference frame of the autocollimator.

Although of obvious utility in many situations, systems such as those disclosed in snyder III and Le Febre et al are principally limited to the determination of the relative orientation between a reference point and a single target point. When plural alignments between a single reference point and multiple target points or stations must be measured however, the use of a single target alignment system consumes significant amounts of time due to the necessity for re-establishing a reference line-of-sight at each of the individual target stations in the multi-target arrangement. Consequently, specialized optical equipment is required if multiple target alignment is to proceed with reasonable efficiency and reliability.

U.S. Pat. No. 3,518,005 issued to Weber on June 30, 1970, and U.S. Pat. No. 3,723,013, issued to Stirland et al on Mar. 27, 1973, illustrate two different prior art approaches to the problems associated with multi-target alignment. The optical bore sighting instrument disclosed in Weber relies upon a series of mirrors and pentaprisms to provide a plurality of superimposed light images which enable visual confirmation of the degree of parallelism between the optical axes of three optical devices. While thus furnishing a means for measuring, in essence, the rotational displacement of multiple target stations relative to the bore sighting instrument, Weber is nevertheless ineffective in detecting translational movement between the various optical axes. On the other hand, Stirland et al employs a plurality of intermediate target photodetectors having central apertures optimally aligned on the axis of a laser beam in order to determine translational displacement of any of the targets relative to the laser axis, but any relative rotation of the targets in the Stirland et al system will escape detection. Accordingly, the prior art fails to reveal a system capable of enabling multi-station alignment wherein both rotational and translational movement relative to a single reference line-of-sight may be measured for each of a plurality of target stations.

DISCLOSURE OF INVENTION

It is therefore a primary object of the present invention to provide an apparatus which enables the alignment of a plurality of target stations to be measured from a single reference station.

It is a further object of the present invention to provide an apparatus which permits multi-station target alignment relative to a single reference line-of-sight without the need for re-establishing the reference line-of-sight at each individual target station.

It is yet a further object of the present invention to provide an apparatus for determining the rotational and translational displacement of a plurality of target stations relative to a single reference line-of-sight without the need for re-establishing the reference line-of-sight at each individual target station.

It is an additional object of the present invention to provide a secondary optical alignment target positioned along the axis of an optical beam directed between an optical beam source and a primary optical alignment target, which secondary optical alignment target simultaneously transmits and reflects the optical beam such that the transmitted portion of the optical beam maintains the reference line-of-sight previously established by the beam axis.

It is also an object of the present invention to provide a secondary optical alignment target positioned along the axis of an optical beam directed between an optical beam source and a primary optical alignment target, which secondary optical alignment target simultaneously transmits and reflects the optical beam such that the transmitted portion of the optical beam maintains the reference line-of-sight previously established by the beam axis while the reflected portion of the optical beam is utilized to determine the translational and rotational displacement of the secondary optical alignment target relative to the reference line-of-sight.

It is still another object of the present invention to provide a plurality of secondary optical alignment targets positioned at a plurality of points along the axis of an optical beam directed between an optical beam source and a primary optical alignment target, which secondary optical alignment targets both transmit and reflect the optical beam such that the transmitted portions of the optical beam maintain the reference line-of-sight previously established by the beam axis while the reflected portions of the optical beam are utilized to determine the translational and rotational displacements of respective secondary optical alignment targets relative to the reference line-of-sight.

These and other objects of the present invention are achieved with a secondary optical alignment target comprising a housing having a beam splitter mounted therein at an angle relative to the longitudinal axis of the housing. The secondary alignment target is secured to a target station, and an optical beam is directed through the housing along an optical axis or reference line-of-sight nominally coincident with the longitudinal axis of the housing. The beam splitter serves to split the optical beam into two portions. One portion of the beam is reflected from the surface of the beam splitter toward the side of the housing, while the other portion of the beam is refracted and passes out of the beam splitter to continue along the initial optical axis, thereby maintaining the previously established reference line-of-sight. A quartz window positioned in the side of the housing intercepts the reflected portion of the beam, whereupon the reflected portion is further split into reflected and refracted sub-portions. The refracted sub-portion of the beam passes on through the quartz window and impinges upon a photodetector to generate an electrical current indicative of the translational displacement of the secondary target, and hence of the target station, with respect to the reference line-of-sight. The reflected sub-portion of the beam is returned to the beam splitter, where it is rereflected back toward the source of the optical beam to a second photodetector which generates a second electrical current indicative of the rotational displacement of the secondary target, and hence the target station, with respect to the reference line-of-sight. If desired, a plurality of secondary alignment targets may be employed at a plurality of target stations to provide multi-target alignment. When multiple target stations are being aligned, a single optical beam is used to establish the reference line-of-sight through each of the secondary alignment targets via respectively refracted beam portions. Blanking shutters slidable within each of the secondary alignment targets are activated to respectively cover all of the quartz windows in the secondary alignment targets except the one quartz window associated with the seconary target and target station undergoing alignment.

BRIEF DESCRIPTION OF DRAWINGS

The various features, objects and advantages of the present invention will become apparent from the following Brief Description of the Drawings and Best Mode For Carrying Out the Invention, wherein.

BEST MODE FOR CARRYING OUT THE INVENTION

Figure 1:
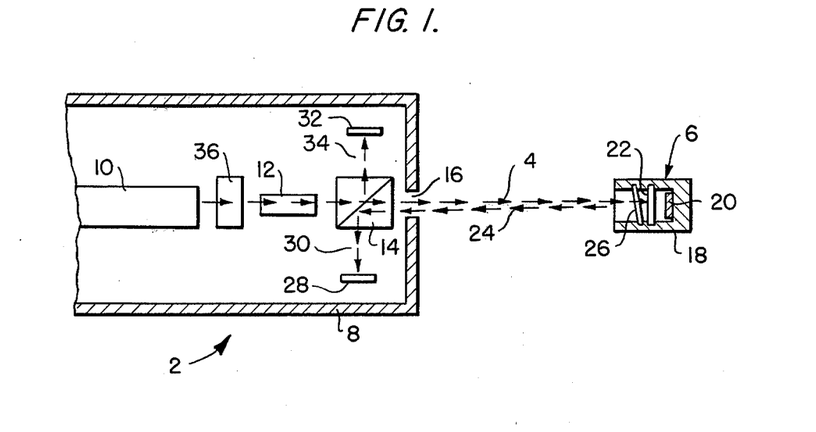
FIg. 1 is a partial cross-sectional view of a single target electro-optical alignment measuring system.

Referring initially to FIG. 1, a partial cross-sectional view of a single target electro-optical alignment measuring system is illustrated. Further detailed description of this single target electro-optical measuring system may be found in co-pending application Ser. No. 17,434 (filed on Mar. 5, 1979) now Pat. No. 4,243,877, assigned to the assignee of the present invention and incorporated herein by reference. The single target system includes an optical head assembly 2 for projecting an optical beam 4 toward a remote reflective target 6 adapted to be mounted on or in contact with portions of an object (not illustrated) the alignment of which is to be tested. Optical head assembly 2 includes a base means in the form of a housing 8 for defining a system reference when mounted on a stable support (not illustrated). Housing 8 may include structure for adjustably positioning the housing with respect to the underlying stable support or may be adapted for permanent mounting on the support when the apparatus is designed to be employed continuously at one location.

To form the optical beam 4, housing 8 includes a light source 10 which may be a laser or other type of light source having the characteristic of producing light of a wavelength detectable by commercially available photodetectors. The light produced by light source 10 is passed through a collimating lens assembly 12 to provide a relatively narrow, highly collimated optical beam 4 which passes through a beam splitter 14 before emerging from housing 8 through an aperture 16.

As noted above, reflective target 6 is mounted in contact with a surface the alignment of which is to be tested. To accomplish this purpose, reflective target 6 includes a housing 18 containing a photodetector 20 arranged perpendicularly to the reference axis 18. Normally, housing 18 will be positioned and oriented such that the reference axis of the housing is nominally aligned with the axis of beam 4. A partially silvered mirror 22 is also mounted within housing 18 to intersect optical beam 4 for forming a return beam 24 out of a first portion of beam 4. Because partially silvered mirror 22 is arranged precisely perpendicularly to the reference axis of housing 18, the central axis of return beam 24 will form an angle with the central axis of projected beam 4 which, in magnitude and orientation, is indicative of the rotational position of the reference axis of housing 18 relative to the central axis of projected beam 4.

Partially silvered mirror 22 permits the remaining portion of projected beam 4 to pass through the mirror and impinge upon photodetector 20. As will be discussed more fully hereinbelow, photodetector 20 is of the type which is capable of determining the lateral or translational position of a light beam impinging thereon relative to the center point on the surface of the photodetector. Accordingly, detector 20 is capable of producing an electrical signal indicative of the translational position of the reflective target 6 relative to the reference position established by the optical head assembly 2 and the projected optical beam 4. At the same time the reflective target 6 operates to produce an optical signal in the form of return beam 24 which is indicative of the rotational position of the reflective target relative to the system reference defined by the optical head assembly 2. To eliminate unwanted reflections a plain glass 26 may be mounted within housing 18 in front of mirror 22 at an acute angle with respect to a plane normal to the central axis of housing 18.

Beam splitter 14 is arranged to direct the return beam 24 onto a photodetector 28 along a path indicated by beam 30. To compensate for light source intensity variation and to assist in filtering out ambient light interference, a reference photodetector 32 may be employed to receive a reference beam 34 formed by beam splitter 14. Additional improvement in the signal to noise ratio can be achieved by employing an optical chopper 36 mounted to blank out optical beam 4 at a predetermined constant frequency as will be discussed more fully hereinbelow.

Figure 2:
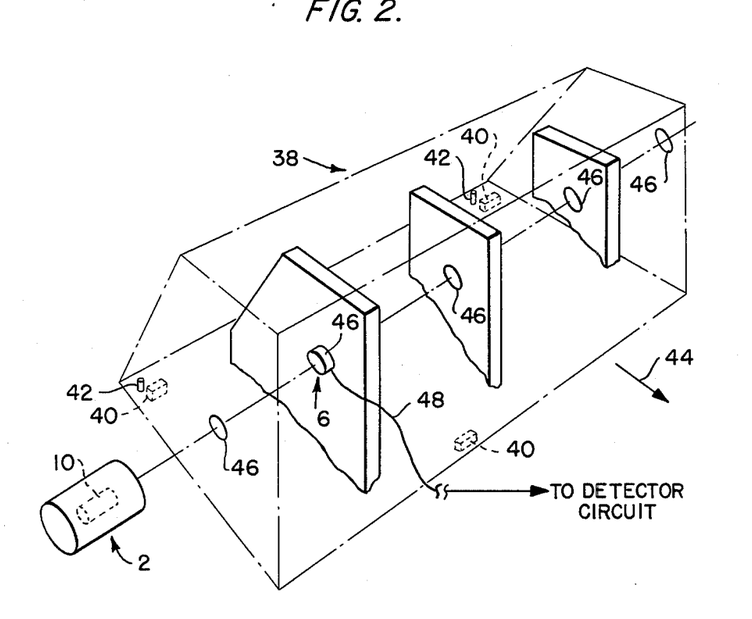
FIG. 2 is a schematic perspective view of an application utilizing the single target electro-optical alignment measuring system of FIG. 1 to test the alignment of bore holes formed in an engine block.

Turning now to FIG. 2, a more specific application of the alignment measuring system disclosed in FIG. 1 is illustrated, wherein an engine block 38 is indicated schematically by dashed lines. An optical head assembly 2 is positioned in a fixed relationship with respect to three positioning stops 40 arranged to engage the engine block to locate the base portion of the engine block in a horizontal (X) plane. The optical head assembly 2 is also positioned in a predetermined fixed relationship to a pair of stops 42 arranged to position the engine block 38 relative to a vertical (Y) plane. The engine block 38 may be moving along a conveyor in the direction illustrated by arrow 44 so as to bring the engine block 38 into engagement with stops 40 and 42. When properly positioned, the axis of optical beam 4 is nominally aligned with the central axis of a plurality of bores 46 machined in the engine block to provide bearing supports for the crank-shaft (not illustrated) of the engine. A reflective target 6 may be positioned within any one of the bore holes 46 such as illustrated in FIG. 2. As described above, the reflective target is adapted to provide an optical signal in the form of a return beam containing information regarding the angular positions such as pitch and yaw, relative to a pair of axes perpendicular to the central axis of the projected optical beam 4. The rotational displacement or pitch and yaw information is read by photodetector 28 within optical head assembly 2. The reflective target 6 further provides an electrical signal on lead 48 indicative of the lateral position of the central axis of reflective target 6 relative to the nominal axis defined by optical head assembly 2.

Figure 3:
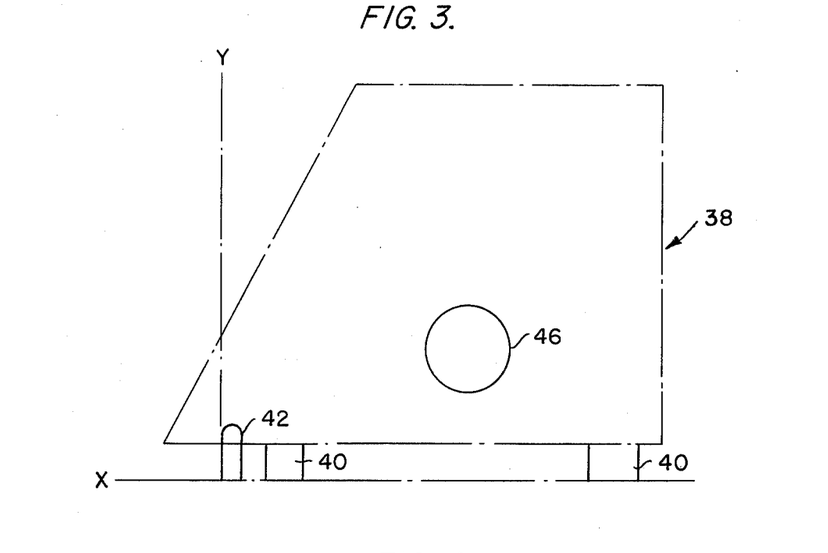
FIG. 3 is an end elevational view of the engine block illustrated in FIG. 2.

FIG. 3 illustrates the position of stops 40 and 42 relative to the bore holes 46 formed in engine block 38. As is apparent in FIG. 3, stops 40 are designed to position the engine relative to a horizontal plane X while stops 42 are employed to position engine block 38 relative to a vertical plane Y.

Figure 4:
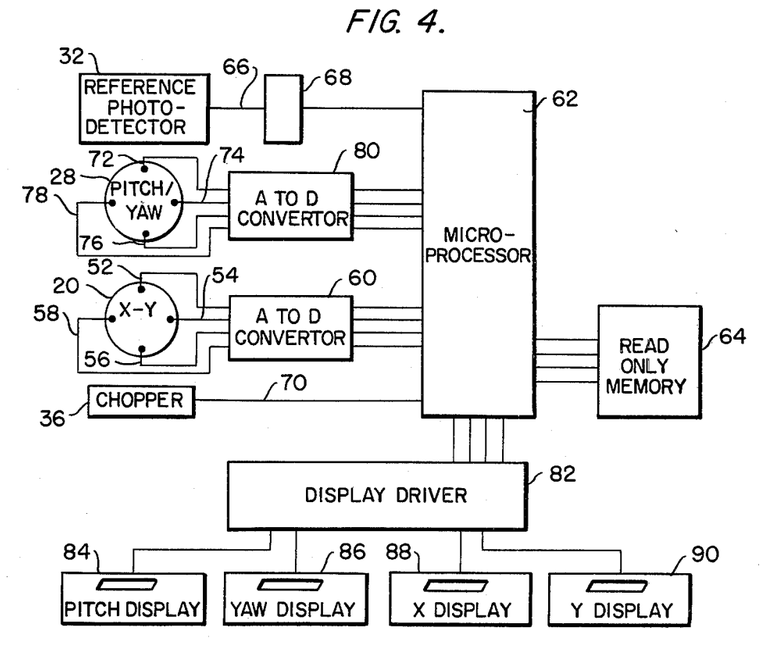
FIG. 4 is a block diagram of an electrical circuit for use with the single target electro-optical alignment measuring system of FIG. 1.

FIG. 4 is a schematic illustration of a circuit which might be employed to provide digital readout of the rotational and translational position of the reflective target relative to a reference position established by an optical head assembly in an electro-optical alignment system of the type illustrated in FIGS. 1 through 3. In particular, photodetector 20 mounted within the reflective target 6 may take the form of a solid state photodetector having four leads 50, 52, 54 and 56 connected at points equidistant from the center of the detector and separated in an equiangular configuration around the circumference of the detector. The material from which the photodetector is formed has the property of changing its resistance when exposed to illumination within a certain wavelength band. Thus, the relative resistance between respective leads will be a measure of the position at which the center of a light beam impinges on the photodetector surface as measured along two perpendicular axes X and Y. By converting the analog signal received on leads 52–58 to a digital form through the use of a conventional A to D converter 60, the relative values may be received and processed by a microprocessor 62 in accordance with a program stored in a conventional read only memory 64. As noted above, a reference photodetector 32 may be employed in the optical head assembly 2 in order to provide a signal on line 66 through an A to D converter 68 which in turn may be used by the microprocessor to cancel out the effect of ambient light and variation in the intensity of light produced by light source 10. Alternatively, the output from reference photodetector 32 may be used in its analog form in a feedback loop connected to the power source or light source 10 in order to maintain a constant output from the light source. Light chopper 36 may be connected to the microprocessor 62 through line 70 in order to provide a signal by which the microprocessor can synchronize sampling of the output from photodetector 20 and photodetector 28 with the blanking of projected optical beam 4 caused by the optical chopper 36.

The photodetector 28 mounted within optical head assembly 2 can be of the same type as photodetector 20 including four separate leads 72, 74, 76, and 78 for connecting photodetector 28 with an A to D converter 80 which in turn is connected to the microprocessor 62 for providing signals thereto regarding the point of impingement of return beam portion 30 relative to the center of the surface of photodetector 28. As is apparent from the geometry of the device illustrated in FIG. 1, detector 28 is capable of indicating the angular position of reflective target 6 relative to a first rotational axis perpendicular to the central axis of projected beam 4 and lying within the plane FIG. 1. Photodetector 28 may also provide a signal indicative of the angular rotation of reflective target 6 relative to an axis perpendicular to the central axis of projected beam 4 and perpendicular to the cross-sectional plane of FIG. 1. Such angular values are conventionally termed "yaw" and "pitch".

Microprocessor 62 is programmed by read only memory 64 to process signals received from detectors 20 and 28 and to send the results in the form of digital signals to a display driver 82. Driver 82 is connected with digital displays 84, 86, 88 and 90 for displaying respectively the pitch and yaw rotational displacement and the X and Y translational displacement of the reflective target 6.

The optical measuring system disclosed in FIGS. 1 through 4 is particularly useful in carrying out a variety of inspection processes designed to verify that machining operations performed on articles of manufacture are within acceptable manufacturing tolerances. The embodiment of FIGS. 1 through 4, of course, employs a single reflective or primary target to determine the translational and rotational displacements of a target station. If an article of manufacture has a plurality of bore holes or target stations such as illustrated in FIG. 3, however, each of the stations must be separately tested by repositioning the single reflective or primary target at the desired station and then reconnecting the electrical circuit of FIG. 4. Moreover, the constant repositioning of the single reflective or primary target occasionally necessitates reestablishment of the reference line-of-sight formed by the laser beam from the optical head assembly. These problems can be overcome with a second embodiment of the subject invention illustrated in FIGS. 5 through 8, whereby successive alignment tests of a plurality of target stations in a multi-target configuration may be performed without having to reposition the reflective target element at each target station and without having to reestablish the reference line-of-sight during the alignment tests.

Figure 5A:
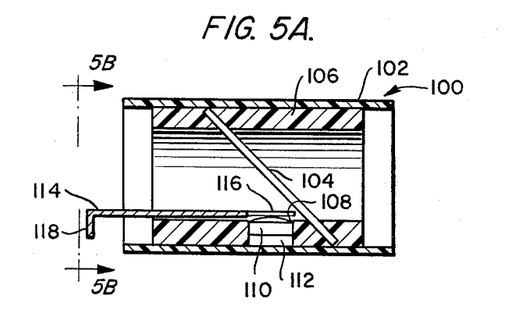
FIG. 5A is a cross-sectional view of the secondary electro-optical alignment target of the present invention.
Figure 5B:
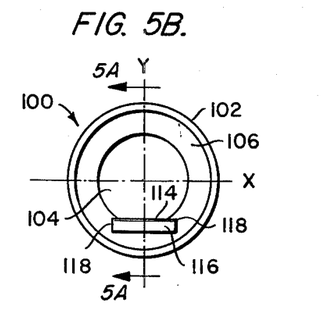
FIG. 5B is an end view of the secondary electro-optical alignment target of the present invention.

FIGS. 5A and 5B respectively provide cross-sectional and end views of the secondary electro-optical alignment target (hereinafter referred to as the secondary alignment target) 100 of the present invention. Secondary alignment target 100 includes a hollow tubular housing 102 formed from durable material such as metal or high-impact plastic having an outer diameter sufficient to fit within the bore holes 46 of FIG. 3. Although housing 102 is tubular in the preferred embodiment, other shapes may be equally appropriate depending upon the nature of the target station to be aligned. A beam splitter 104 is mounted within secondary alignment target 100 at an angle relative to the longitudinal axis of housing 102 and is secured to housing 102 by a retainer 106. Beam splitter 104 is designed to transmit and reflect respective portions of an incident light beam simultaneously. The transmitted portion of light passes completely through the beam splitter and continues radiating along the optical path previously established by the incident beam. To this end, beam splitter 104 may be a pellicle or thin film beam splitter having refractive properties which govern the passage of light therethrough. The composition of the beam splitter may be adjusted in a conventional manner to provide any desired proportional ratio between reflected and refracted light (i.e., 65% reflection—35% refraction; 50% reflection—50% refraction; 40% reflection—60% refraction, etc.). The angle between beam splitter 104 and the longitudinal axis of housing 102 is preferably 45% but other angles may be employed if suitable modifications to the secondary alignment target components are made. Retainer 106 can be molded from a plastic material as a single piece and beam splitter 104 may then be embedded in the retainer. Alternately, retainer 106 may be formed in two parts (not shown), each of which is inserted into an opposite side of housing 102 to clamp beam splitter 104 therebetween.

A cavity 108 is formed in retainer 106 beneath beam splitter 104 and a quartz window 110 is mounted in the cavity to intercept the portion of the optical beam reflected from beam splitter 104. The quartz window 110 contains an optical coating (not shown) which also simultaneously reflects and transmits or refracts incident light in inversely varying proportions depending upon the amount of coating employed. A photodetector 112 mounted in cavity 108 immediately beneath quartz window 110 receives light refracted through the quartz window. Photodetector 112 is a four-quadrant photodetector of the type employed in the optical alignment measuring system disclosed in FIGS. 1 through 4. Thus, the amount by which the center of a light beam impinging on the photodetector surface is displaced from the center of the photodetector surface can be determined by measuring the relative resistance between four leads respectively connected at equidistant and equiangular points around the circumference of the photodetector. In the preferred embodiment of the present invention, cavity 108 and beam splitter 104 are positioned such that an optical beam having an optical axis coincident with the longitudinal axis of target housing 102 strikes the center of the beam splitter and is directed toward the center of quartz window 110. Photodetector 112 is in turn positioned relative to quartz window 110 such that the reflected portion of the beam striking the center of the window is partially refracted through the window to impinge on the center of the photodetector.

A blanking shutter 114 slidable along a pair of grooves 116 formed in retainer 106 is used to cover quartz window 110, thereby preventing both the reflection of light from the quartz window back towards beam splitter 104 and the refraction of light through the quartz window to photodetector 112. The necessity for blocking the reflection and refraction of light at quartz window 110 arises as a consequence of using secondary alignment target 100 during multi-target alignment testing, discussed more fully hereinbelow. Blanking shutter 114 may be actuated to cover quartz window 110 by applying a manual force to lip 118 to slide shutter 114 along grooves 116. If desired, however, an electrically-activated means such as a solenoid-type mechanism (not shown) can be used to operate blanking shutter 114. As a further alternative, mechanical blanking can be dispensed with entirely by replacing blanking shutter 114 with a thin membrane LCD (not shown) which covers quartz window 110 and is electronically controlled to provide blanking capability.

Figure 6:
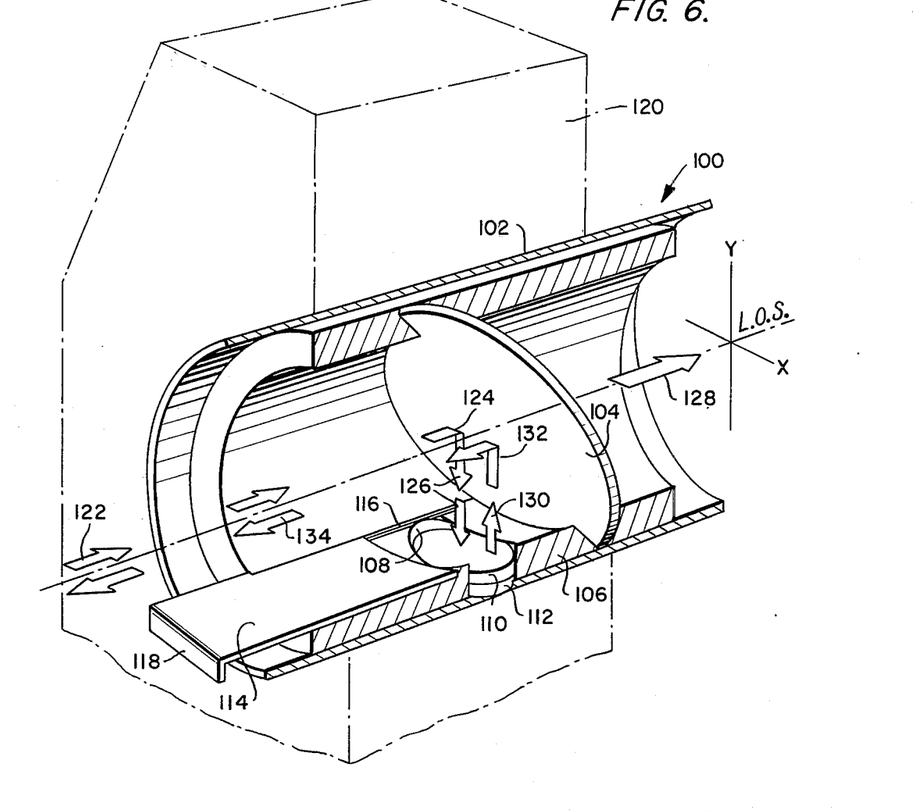
FIG. 6 is a perspective cross-sectional view illustrating the various reflections and refractions of an optical beam intercepting the secondary electro-optical alignment target of FIGS. 5A and 5B at a target station.

The use of a secondary electro-optical alignment target constructed in accordance with the present invention will now be described in detail. As indicated in FIG. 6, target 100 is secured to a target station 120 such that the longitudinal axis of target housing 102 is nominally coincident with a reference line-of-sight established by the axis of an optical beam 122. Beam 122 enters target 100 and strikes the surface of beam splitter 104 at point 124, whereupon the beam splitter splits optical beam 122 into two portions. One portion 126 of the beam is reflected from the beam splitter toward quartz window 110 and photodetector 112, while the other portion 128 of the beam is refracted and passes out of beam splitter 104 to continue along the initial optical axis. The previously established reference line-of-sight is thus maintained without distortion. If blanking shutter 114 has not been actuated to cover quartz window 110, the reflected portion 126 of the optical beam reaches the quartz window and is further split into reflected and refracted sub-portions by the aforementioned optical coating. The refracted sub-portion (not shown) of the beam passes on through quartz window 110 to impinge on photodetector 112, thereby creating a resistive relationship between the four photodetector leads. As explained above, when the orientation of target station 120 is such that the optical axis of beam 122, and the corresponding reference line-of-sight, intercepts the exact center of beam splitter 104, the refracted sub-portion of the beam will impinge directly upon the center of photodetector 112 to create a resistive balance between the photodetector leads. Consequently, electrical current passing through the leads will indicate no X/Y or translational displacement of secondary alignment target 100 and hence no X/Y or translational displacement of target station 120 relative to the reference line-of-sight. On the other hand, if the optical axis of beam 122 intercepts beam splitter 104 at a point other than the center of the beam splitter, the refracted subportion of the beam will impinge on photodetector 112 at a point removed from the photodetector center. Resistive and current imbalances subsequently generated between the photodetector leads can then be used to indicate the extent of the X/Y or translational displacement of secondary alignment target 100, and hence the extent of the X/Y or translational displacement of target station 120, with respect to the reference line-of-sight.

The sub-portion 130 of the optical beam reflected from quartz window 110 is returned to the beam splitter 104 where it is rereflected at point 132 to form a return beam 134 which nominally travels back along the reference line-of-sight toward the optical source of beam 122. A second photodetector similar to photodetector 28 mounted in the optical head assembly 2 illustrated in FIG. 1 may be used to detect return beam 134. As is evident from the geometry of the preferred embodiment, when the longitudinal axis of target housing 102 is actually coincident with the optical axis or reference line-of-sight established by beam 122, i.e., when secondary alignment target 100 and reference station 120 are not rotationally displaced relative to the reference line-of-sight, the reflected portion 126 of beam 122 will be oriented at exactly 90° relative to the longitudinal axis of housing 102. Because reflected portion 126 of the optical beam undergoes a 180° reflection at quartz window 110, reflected sub-portion 130 of the optical beam is also oriented at 90° relative to the longitudinal axis of housing 102. Accordingly, when reflected sub-portion 130 is rereflected at point 132 to form return beam 134, return beam 134 will be exactly parallel to both the longitudinal axis of housing 102 and the coincident reference line-of-sight established by the optical axis of beam 122. Subsequent detection of the return beam 134 by a photodetector such as photodetector 28 will indicate that secondary alignment target 100, and hence target station 120, has not been rotationally displaced relative to the reference line-of-sight.

Where rotation of target 100 and target station 120 about either the X (pitch) or Y (yaw) axis has occurred, however, the optical axis of beam 122 and the reference line-of-sight established thereby no longer coincide with the longitudinal axis of target housing 102. Reflected portion 126 of the optical beam will deviate from the 90° or perpendicular relationship which exists between reflected portion 126 and the longitudinal axis of target housing 102 during conditions of alignment. This deviation will continue through the reflection occurring in quartz window 110, and reflected sub-portion 130 will in turn intercept beam splitter 104 at an angle which causes return beam 134 to deviate from the optical axis of beam 122 by an amount indicative in both magnitude and orientation of the rotational displacement of the target housing longitudinal axis relative to the optical axis. Detection of this deviation by a photodetector will furnish a measure of the rotational displacement of secondary alignment target 100 and target station 120 relative to the reference line-of-sight.

Industrial Applicability

Figure 7:
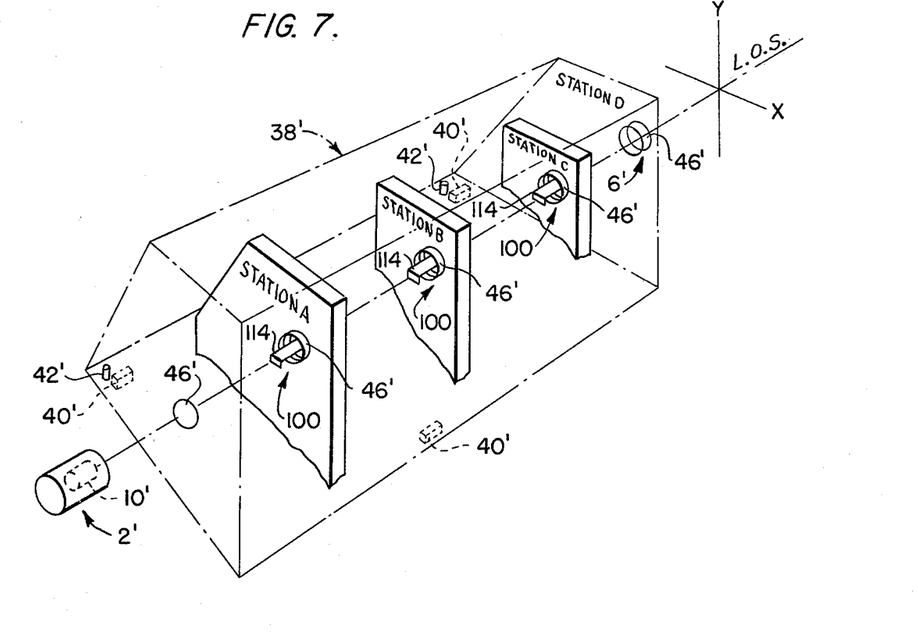
FIG. 7 is a schematic perspective view of an application employing a plurality of secondary electro-optical alignment targets to test the alignment of a plurality of engine block bore holes while using a single reference line-of-sight.

With a secondary electro-optical alignment target constructed in accordance with the second embodiment of the present invention, it is now possible to perform multi-target alignment testing using the optical alignment measuring system illustrated in FIGS. 1 through 4 without having to reposition the primary target or reestablish the reference line-of-sight at each target station. Reference is first made to FIG. 7, wherein elements corresponding to like elements in the embodiment of FIGS. 1 through 4 are designated with a prime.

In order to determine the alignment of a plurality of bores 46' machined in an engine block 38' to provide bearing supports for the engine crankshaft (not shown), engine block 38' is brought into engagement with stops 40', 42' to position the engine block 38' relative to horizontal (X) and vertical (Y) reference planes. Although only five boreholes are shown in engine block 38', it is understood that any number of boreholes could be aligned without departing from the scope of the present invention. An optical head assembly 2' is placed in position to provide an optical beam parallel to the horizontal (X) reference plane. A primary reflective target 6' is installed in the borehole 46', also indicated as Station D in FIG. 7, located furthest from optical head assembly 2'. Primary reflective target 6' is identical in every critical respect to prior art reflective target 6 in FIG. 1, but additionally includes a blanking shutter (not shown) which functions in a manner analogous to blanking shutter 114 to cover the partially silvered mirror (not shown) used to form a return beam in primary reflective target 6'. A plurality of secondary alignment targets 100 are respectively installed in the boreholes 46' intermediate optical head assembly 2' and the borehole 46' containing primary reflective target 6'. These intermediate boreholes are indicated as stations A-C in FIG. 7.

The light source 10' in optical head assembly 2' is next activated to generate an optical beam as previously described in connection with FIG. 1. A reference line-of-sight for the alignment test is established using a procedure known as "bucking-in". The optical beam generated by light source 10' is directed through the secondary targets 100 installed at stations A-C such that the optical axis of the beam nominally coincides with the longitudinal axes of the respective target housings. Blanking shutters 114 are simultaneously activated to cover the quartz windows in each of the secondary targets 100, thus preventing the quartz windows from reflecting any light to form return beams in the secondary alignment targets. Meanwhile, the optical beam is refracted at each secondary target beam splitter without obstruction. It can be seen that the refracted portion of the beam exiting the final secondary target 100 at station C reaches primary reflective target 6' to energize X/Y photodetector 20' (not shown in FIG. 7) and form a return beam which energizes pitch/yaw photodetector 28' (not shown in FIG. 7) in optical head assembly 2'. The position of the optical head assembly 2' relative to the X and Y reference plane is adjusted until the signals from photodetectors 20' and 28' indicate that primary reflective target 6' is not rotationally or translationally displaced with respect to the optical beam axis. The partially silvered mirror in primary reflective target 6' is then covered to prevent the formation of a return beam from station D. Blanking shutter 114 in the station A secondary target is subsequently actuated to uncover the quartz window in the station A secondary alignment target, giving rise to reflected and refracted beam sub-portions which provide optical information regarding the rotational and traslational displacement of station A relative to the optical axis. The position of optical head assembly 2' is readjusted until the signals generated by the station A X/Y photodetector and the optical head assembly pitch/yaw photodetector indicate that station A is not rotationally or translationally displaced, at which point the quartz window in the station A secondary target is again covered by blanking shutter 114 and the partially silvered mirror in primary reflective target 6' is again uncovered to determine the effects of the optical head assembly readjustment on the alignment of station D. The alignment process is repeated back and forth between stations A and D, making successively smaller readjustments to the position of the optical head assembly 2', until the optical head assembly is "bucked-in" to both stations A and D, i.e., until the signal generated in the X/Y photodetectors at stations A and D and the pitch/yaw photodetector in optical head assembly 2' indicate that stations A and D exhibit no rotational or translational displacement relative to one another. If necessary, the position of Station A can also be slightly re-adjusted to assist in eliminating any persistant relative rotational or translational displacements.

"Bucking-in" of the optical head assembly 2' between stations A and D establishes the optical axis of the beam passing through station A to station D as the reference line-of-sight. Thereafter, the rotational and traslational displacements of each of the remaining intermediate target stations (i.e., stations B and C) relative to the reference line-of-sight can be monitored by covering the X/Y photodetectors and blocking the return beams at all of the target stations except the desired target station. The quartz window in the secondary alignment target installed at the desired target station, of course, is left uncovered to permit light from the reflected portion of the optical beam to impinge upon the X/Y photodetector positioned therein and to form a return beam from the light reflected at the quartz window for carrying information regarding the rotational displacement of the desired target station back to the pitch/yaw photodetector in the optical head assembly.

Figure 8:
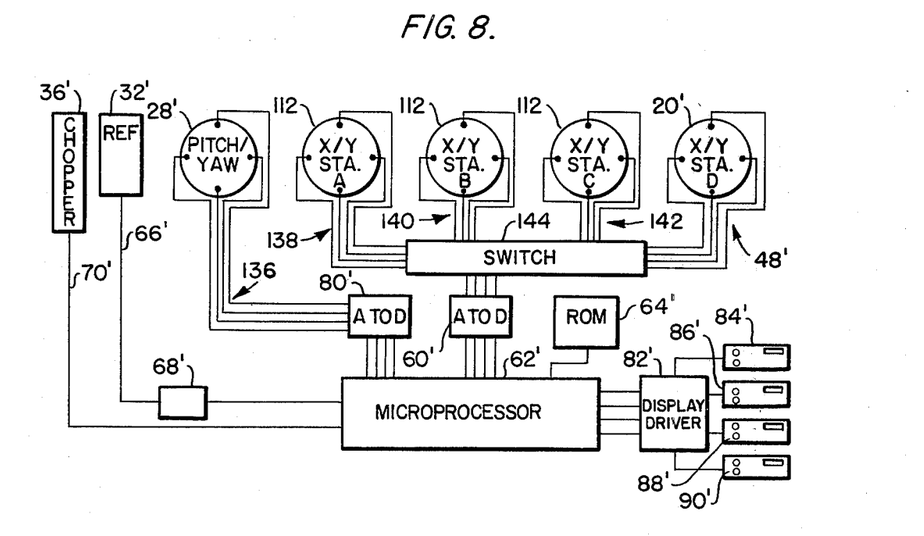
FIG. 8 is a block diagram of an electrical circuit for use with the electro-optical alignment measuring system of FIG. 7, in which both rotational and translational displacement relative to the reference line-of-sight may be sensed and displayed for each of the plurality of target stations depicted in FIG. 7.

FIG. 8 illustrates the circuit of FIG. 4 as modified for use with the alignment measuring system of FIG. 7. Elements corresponding to like elements in the apparatus of FIGS. 1 through 4 are again designated with a prime. Thus, four quadrant pitch/yaw photodetector 28' mounted within optical head assembly 2' is connected via four leads, indicated generally at 136 in FIG. 8, to an A/D converter 80'. Photodetector 28' is capable of providing analog signals indicative of the point at which a return beam from primary reflective target 6' or one of the secondary alignment targets 100 impinge on the surface of photodetector 28' relative to the center of the photodetector surface. Indication of the point of impingement of the return beam in turn provides a measure of the angular displacement of the primary reflective target or secondary alignment target about the reference line-of-sight relative to the "pitch" (X) and "yaw" (Y) axes. A/D converter 80' converts the analog signals received from photodetector 28' into digital signals for processing by a microprocessor 62'.

Similarly, the X/Y photodetectors 20', 112, 112, 112 positioned respectively within the primary reflective target 6' and secondary alignment targets 100 are connected respectively via four lead conductors 48', 138, 140, and 142 to A/D converter 60' through switching means 144. Switching means 144 permits the connection of only one X/Y photodetector at a time to A/D converter 60'. The operation of switching means 144 must be synchronized with the operation of the blanking shutters in primary reflective target 6' and secondary alignment targets 100 in order to insure that the X/Y photodetector connected to A/D converter 60' is the X/Y photodetector receiving light at the time. If the blanking shutters are electrically activated, switching means 144 can be designed to provide a synchronous activating signal for the shutters. A/D converter 60' digitizes the analog signals from the selected X/Y photodetector, and microprocessor 62' processes the digitized signals to provide an output indicative of the point at which light from the optical beam impinges on the X/Y photodetector surface relative to the center of the photodetector surface, and hence a measure of the translational displacement of stations A, B, C or D relative to the reference line-of-sight.

As noted above in connection with FIGS. 1 through 4, a reference photodetector 32' employed in optical head assembly 2' provides a signal on line 66' through an A/D converter 68', which signal may be used by the microprocessor to cancel out the effects of ambient light and variation in the intensity of light produced by light source 10'. Light chopper 36' is connected to the microprocessor 62' through line 70' in order to provide a signal enabling the microprocessor to synchronize the sampling of the output from the X/Y photodetectors 20', 112, 112, 112 and pitch/yaw photodetector 28' with the blanking of optical beam 4' caused by the optical chopper 36'.

Microprocessor 62' processes the signals received from the various photodetectors 20', 28', 112, 112, 112 in accordance with a program stored in conventional read-only-memory 64'. The digital output from the microprocessor is supplied to display driver 82'. Digital diplays 84', 86', 88' and 90' are connected to display drive 82' for respectively displaying the rotational pitch and yaw displacements and the X and Y translational displacements of the target station under examination.

Only one embodiment of the present invention has been shown and described in the preceeding specification. It is understood, however, that various additional changes and modifications to the form and detail of the secondary electro-optical alignment target illustrated above may be made by those skilled in the art without departing from the scope and spirit of the present invention. It is, therefore, the intention of the inventor to be limited only by the following claims.

I claim:

1. A target apparatus for use in optically determining the translational and rotational orientation of a target station relative to a reference line-of-sight established by an optical beam, said target apparatus comprising:
   (a) a housing structure mountable in fixed relationship to the target station;
   (b) beam splitting means positioned by said housing structure to transmit a first portion of the optical beam in a continuous path along the established reference line-of-sight while simultaneously reflecting a second portion of the optical beam at an angle relative to the reference line-of-sight;
   (c) optical window means disposed in said housing structure to receive said second portion of the optical beam and to transmit a first sub-portion of said second beam portion while simultaneously reflecting a second sub-portion of said second beam portion back toward said beam splitting means such that said second sub-portion is rereflected at said beam splitting means to provide an optical signal indicative of the rotational orientation of the target station relative to the reference line-of-sight; and
   (d) detecting means for receiving said first sub-portion from said optical window means to provide an electrical signal indicative of the translational orientation of the target station relative to the reference line-of-sight.

2. Target apparatus as set forth in claim 1, wherein said housing structure is a hollow cylindrical structure having a longitudinal axis which nominally coincides with the reference line-of-sight.

3. Target apparatus as set forth in claim 2, wherein said beam splitting means is mounted within said housing structure at an angle relative to said longitudinal axis.

4. Target apparatus as set forth in claim 3, wherein said angle is 45°.

5. Target apparatus as set forth in claim 2, wherein said beam splitting means is secured within said housing structure by a hollow cylindrical retainer structure.

6. Target apparatus as set forth in claim 1, including a shutter means for covering said optical window means to prevent said second portion of said optical beam from reaching said optical window means.

7. Target apparatus as set forth in claim 6, wherein said shutter means is manually actuated.

8. Target apparatus as set forth in claim 6, wherein said shutter means is electrically activated.

9. Target apparatus as set forth in claim 1, wherein said beam splitting means is a thin film beam splitter which simultaneously refracts and reflects light incident thereon.

10. Target apparatus as set forth in claim 1, wherein said optical window means includes a quartz window.

11. Target apparatus as set forth in claim 10, wherein said quartz window is optically coated to simultaneously refract and reflect light incident thereon.

12. A system for optically determining the translational and rotational orientation of a plurality of target stations including a final target station and at least one intermediate target station positioned generally along a reference line-of-sight, said system comprising:
(a) an optical beam forming means for forming and projecting an optical beam along the reference line-of-sight;
(b) first target means mounted on one of the intermediate target stations for receiving said optical beam and for transmitting a first portion of said optical beam in a continuous path along the established reference line-of-sight while simultaneously redirecting a second portion of said optical beam, said first target means including a sensor means for receiving said redirected second portion of said optical beam to generate a first electrical signal indicative of the translational displacement of the intermediate target station relative to the reference line-of-sight while simultaneously redirecting a sub-portion of said redirected second beam portion to indicate the rotational displacement of the intermediate target station relative to the reference line-of-sight; and
(c) a second target means mounted on the final target station for receiving said first portion of said optical beam and for redirecting a sub-portion of said first beam portion to indicate the rotational displacement of the final target station relative to the reference line-of-sight and for generating a second electrical signal indicative of the translational displacement of the final target station relative to the reference line-of-sight.

13. A system as set forth in claim 12, wherein said sensor means includes a first photodetector which generates said first electrical signal and said second target means includes a second photodetector which generates said second electrical signal.

14. A system as set forth in claim 13, including a third photodetector means for receiving said redirected sub-portion of said redirected second beam portion from said first target means to generate a third electrical signal indicative of the rotational displacement of the intermediate target station relative to the reference line-of-sight and for receiving said redirected sub-portion of said first beam portion from said second target means to generate a fourth electrical signal indicative of the rotational displacement of the final target station relative to the reference line-of-sight.

15. A system as set forth in claim 14, wherein:
(a) said first target means includes a first shutter means for preventing said sensor means from receiving said second portion of said optical beam while said second target means is redirecting said sub-portion of said first beam portion; and
(b) said second target means includes a second shutter means for preventing said second target means from redirecting said sub-portion of said first beam portion while said first target means is redirecting said sub-portion of said redirected second beam portion.

16. A system as set forth in claim 15, including a circuit means for electronically processing said first and third electrical signals to provide respective digital representations of the translational and rotational displacements of the intermediate target station relative to the reference line-of-sight while said second shutter means is actuated to prevent the redirection of said sub-portion of said first beam portion and for electronically processing said second and fourth electrical signals to provide respective digital representations of the translational and rotational displacements of the final target station relative to the reference line-of-sight while said first shutter means is actuated to prevent said sensor means from receiving said second portion of said optical beam.

17. A system as set forth in claim 16, wherein said circuit means includes an A/D converter for converting said first and second electrical signals to digital form for processing in said circuit means and switching means for alternately connecting said first or second electrical signal to said A/D converter in synchronism with the actuation of said first or second shutter means.

18. A system as set forth in claim 12, wherein said optical beam forming means includes a laser.

19. A method for measuring the rotational and translational alignment of a target station relative to a reference line-of-sight without interrupting the reference line-of-sight, said method comprising the steps of:
(a) forming an optical beam;
(b) projecting said optical beam along an optical axis extending toward the target station such that said optical axis establishes the reference line-of-sight;
(c) transmitting a first portion of said optical beam at the target station such that said first portion continues along the established reference line-of-sight;
(d) reflecting a second portion of said optical beam at the target station;
(e) transmitting a first sub-portion of said second beam portion while simultaneously reflecting and returning a second sub-portion of said second beam portion along a return beam axis at an angle with respect to said optical axis, which angle is indicative of the rotational displacement of the target station relative to the reference line-of-sight;

(f) sensing said first sub-portion of said second beam portion to generate an electrical signal indicative of the translational displacement of the target station relative to the reference line-of-sight; and (g) sensing said second sub-portion of said second beam portion to produce an electrical signal indicative of the rotational displacement of the target station relative to the reference line-of-sight.

20. A method for measuring the rotational and translational displacements of a final target station and at least one additional intermediate target station relative to a reference line-of-sight, said method comprising the steps:

(a) forming an optical beam;

(b) projecting said optical beam along an optical axis extending toward both the final target station and the intermediate target station such that said optical axis establishes the reference line-of-sight;

(c) transmitting a first portion of said optical beam at said intermediate target station such that said first portion of said optical beam continues along the established reference line-of-sight;

(d) reflecting a second portion of said optical beam at said intermediate target station;

(e) transmitting a first sub-portion of said second beam portion at said intermediate target station while simultaneously reflecting and returning a second sub-portion of said second beam portion from said intermediate target station along a first return beam axis at a first angle with respect to said optical axis, which first angle is indicative of the rotational displacement of the intermediate target station relative to the reference line-of-sight;

(f) returning a sub-portion of said first beam portion from said final target station along a second return beam axis at a second angle with respect to said optical axis, which second angle is indicative of the rotational displacement of the final target station relative to the reference line-of-sight;

(g) sensing said first sub-portion of said second beam portion at the intermediate target station to generate an electrical signal indicative of the translational displacement of the intermediate target station relative to the reference line-of-sight;

(h) sensing said second sub-portion of said second beam portion returned along said first return beam axis to generate an electrical signal indicative of the rotational displacement of the intermediate target station relative to the reference line-of-sight;

(i) sensing said sub-portion of said first beam portion returned along said second return beam axis to generate an electrical signal indicative of the rotational displacement of the final target station relative to the reference line-of-sight; and (j) sensing the remaining part of said first beam portion at the end target station to generate an electrical signal indicative of the translational displacement of the final target station relative to the reference line-of-sight.

21. A system for optically determining the translational and rotational orientation of a plurality of target stations positioned generally along a reference line-of-sight, said system comprising:

(a) an optical beam forming means for forming and projecting an optical beam along the reference line-of-sight; and (b) alignment testing means for determining the orientation of the target stations with respect to the reference line-of-sight, said alignment testing means including a plurality of target means respectively mounted on the plurality of target stations, each said target means including (1) transmitting means for transmitting a portion of said optical beam to a successive target means along the established reference line-of-sight, (2) detector means for sensing a first subportion of said optical beam for generating an electrical signal indicative of the translational displacement of the associated target station relative to the reference line-of-sight, and (3) redirecting means for redirecting back to said optical beam forming means a second subportion of said optical beam indicative of the rotational displacement of the associated target station relative to the reference line-of-sight; and (c) photodetector means for receiving at separate times said redirected second subportions from each of said target means for generating an electric signal indicative of the rotational displacement of the associated said target means.

* * * * *